United States Patent [19]

Fulkerson

[11] Patent Number: 4,771,182

[45] Date of Patent: Sep. 13, 1988

[54] SPURIOUS ELECTROMAGNETIC ENERGY DISCRIMINATOR FOR ELECTRO-OPTICAL INSPECTION SYSTEMS

[75] Inventor: Emmet M. Fulkerson, Cincinnati, Ohio

[73] Assignee: General Electric Company, Cincinnati, Ohio

[21] Appl. No.: 898,561

[22] Filed: Aug. 21, 1986

[51] Int. Cl.$^4$ ............................................ G01N 21/86
[52] U.S. Cl. ...................................... 250/561; 356/381
[58] Field of Search ............... 250/560, 561, 201 AF, 250/201 DF; 356/1, 4, 376, 381

[56] References Cited

U.S. PATENT DOCUMENTS

| | | | |
|---|---|---|---|
| 3,994,589 | 11/1976 | Nodwell et al. | 356/381 |
| 4,074,104 | 2/1978 | Fulkerson | 250/492.3 |
| 4,204,772 | 5/1980 | Balasubramanian | 356/376 |
| 4,326,804 | 4/1982 | Mossey | 250/561 |
| 4,630,927 | 12/1986 | Fulkerson | 356/372 |

Primary Examiner—David C. Nelms
Assistant Examiner—Stephone B. Allen
Attorney, Agent, or Firm—Derek P. Lawrence; Nathan D. Herkamp

[57] ABSTRACT

An electro-optical system for inspecting an object includes a source producing a beam of electromagnetic energy, for example, a laser. It also includes a means for discriminating between electromagnetic energy of the beam scattered from objects within a predetermined distance of a plane intersected by the beam of electromagnetic energy and electromagnetic energy not so scattered. Thus, spurious electromagnetic energy scatteed by other objects near the inspected object are ignored.

8 Claims, 4 Drawing Sheets

SPURIOUS ELECTROMAGNETIC ENERGY DISCRIMINATOR FOR ELECTRO-OPTICAL INSPECTION SYSTEMS

FIELD OF THE INVENTION

The invention relates to minimizing errors caused by spurious scattering of electromagnetic energy in an electro-optical inspection apparatus.

BACKGROUND OF THE INVENTION

Aircraft gas turbine engines typically employ several compressor and turbine stages contained in a shroud. Each stage consists of one or more disks having blades inserted into slots on the periphery of each of the disks. The disks are fastened to each other along a common centerline of rotation, thus forming either a generally cylindrical compressor or turbine rotor having a number of radially extending blades.

Engine efficiency is highly dependent on reducing as much as possible the clearance between the radially outermost edges or tips of the blades and the inner surface of the shroud. This requirement dictates that the finished diameter of each stage, that is, the length of the blades, be uniform and precisely controlled. To achieve a desired rotor diameter, the rotor is mounted on a grinding machine which grinds the tips of the blades so that the blades have uniform and precisely controlled lengths. The rotor is rotated at a high rate of speed and an abrasive element is urged against the rotating blade tips to grind the blades to a desired length. Because the blades are fitted somewhat loosely in the slots in the disks, the rotor is rotated at a high rate of speed during grinding so that centrifugal forces thrust the blades radially outwardly to approximate their positions during normal engine operation.

In the past, verification of the finished lengths of the blades on the stages of the rotor was accomplished by placing the ground rotor in an inspection station and by taking physical measurements with conventional gauging tools. If the inspection revealed that rotor measurements, that is, the blade lengths, were not within specified tolerances, regrinding and subsequent reinspection were required. This involved several time-consuming steps, and the potential for error was great. An electro-optical gauging system was developed which performed a gauging operation while the rotor was rotated at high speed on the grinding machine itself. An example of such an electro-optical system is described U.S. patent application Ser. No. 466,741, filed Feb. 15, 1983. Although such electro-optical systems are significant advances over prior gauging systems, the accuracy of such systems may be affected by extraneous electromagnetic energy, for example, electromagnetic energy scattered by objects in the vicinity of an object being inspected. This problem is of particular concern when an electromagnetic energy source illuminates a rapidly moving object under inspection. The extraneous electromagnetic energy may be misinterpreted by the system as indications of object presence, dimensions, or position. A need thus exists for an electro-optical gauging apparatus in which these detrimental effects of extraneous electromagnetic energy are substantially reduced or eliminated. This is true not only for the inspection of gas turbine engine components but also in any situation where the presence, dimensions, or position of an object need to be ascertained, for example, in machine tools.

Accordingly, it is an object of this invention to provide an electro-optical inspection apparatus which is insensitive to the effects of extraneously produced electromagnetic energy.

SUMMARY OF THE INVENTION

In one embodiment, the invention relates to an electro-optical inspection system having a means for producing a beam of electromagnetic energy and a means for discriminating between electromagnetic energy of the beam scattered from objects within a predetermined distance of a plane through which the beam passes and electromagnetic energy scattered by objects situated at a distance from that plane greater than the predetermined distance.

DETAILED DESCRIPTION OF THE INVENTION

Figure 1:
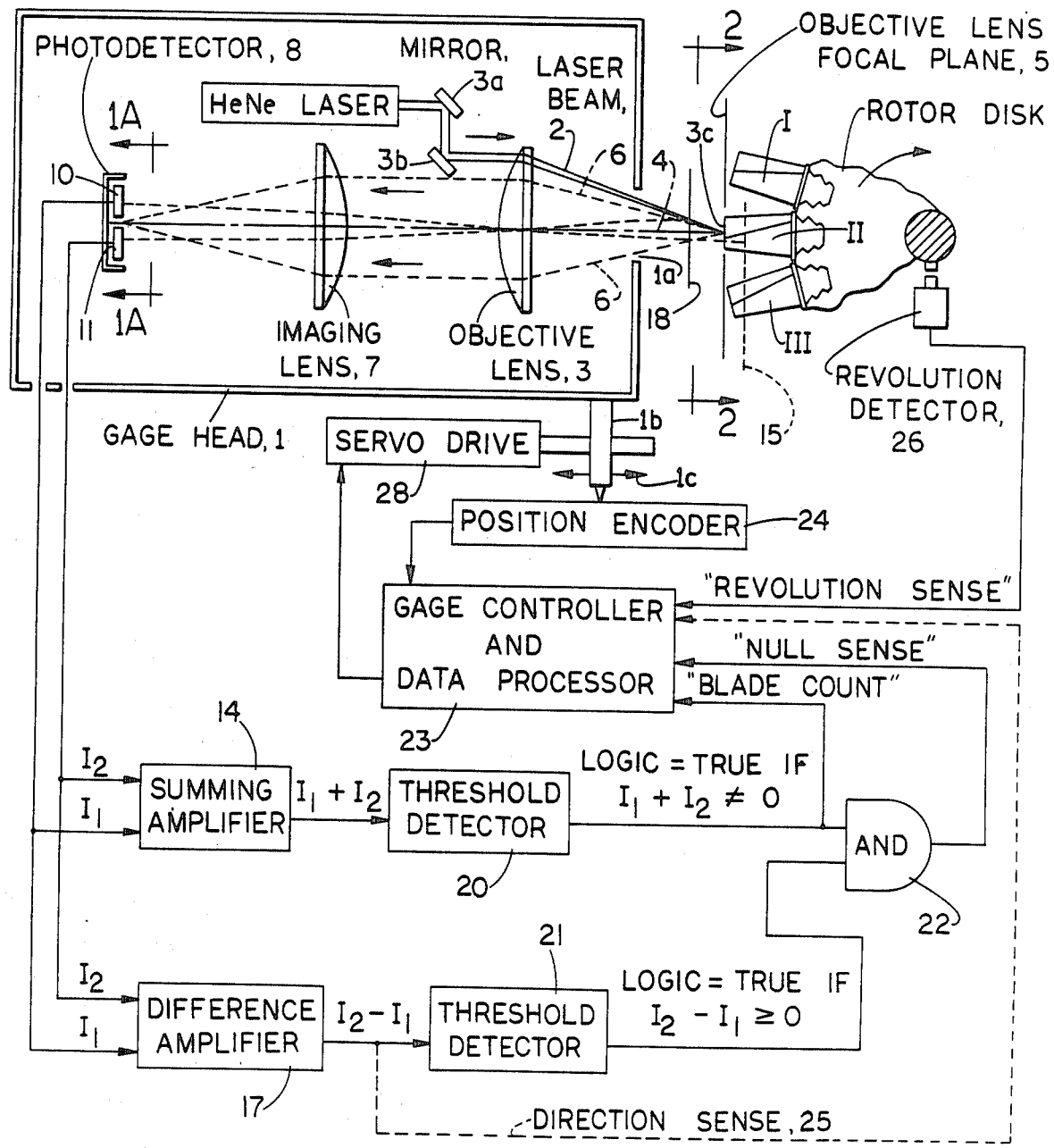
FIG. 1 shows an electro-optical apparatus for inspecting an object.

FIG. 1 shows a gauge head 1 which is essentially an optical triangulation apparatus. A laser, which may be a helium-neon laser, produces a beam 2 of electromagnetic energy. The beam is directed by mirrors 3a and 3b and an objective lens 3 through an aperture 1a in the housing of the gauge head. The objective lens 3 focuses the beam of electromagnetic energy at a focal point 3c. The focal point 3c is on the optical axis 4 of the objective lens 3. A focal plane 5 normal to the optical axis 4 contains the focal point 3b, and intersects the optical axis 4 and the laser beam 2. A target surface, such as the tip of a blade II attached to a rotor disk for a gas turbine engine rotating on, for example, a grinding machine, is situated in the focal plane 5 at the focal point 3c. The focused laser beam 2 falls on the tip of blade II at the focal point of the objective lens 3.

Electromagnetic energy backscattered from this point is passed through the objective lens 3 and focused by an imaging lens 7 onto a photodetector 8. The imaging lens 7 has its an optical axis coincident with axis 4, as shown in FIG. 1. The photodetector 8 is positioned so that the backscattered electromagnetic energy falls on the center of the photodetector 8 so that two closely spaced photocells 10 and 11 are equally illuminated. A United Detector Technology PIN Spot/2D, with intercell spacing of 0.005 in., is an example of a detector that may be used in the apparatus of FIG. 1.

Figure 1A:
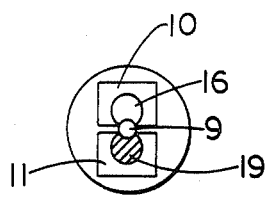
FIG. 1A is a view of the FIG. 1 apparatus in a direction indicated by arrows 1A—1A.

The gauge head 1 is attached to a slide mechanism 1b which is driven by a servo drive 28 in a generally horizontal direction indicated by arrow 1c toward and away from the blade tips. In FIG. 1, the slide mechanism and the servo drive have situated the gauge head at a position where the tip of blade II is in the focal plane of the objective lens and the beam of electromagnetic energy falls on the blade tip at the focal point of the objective lens. Under those conditions, backscattered electromagnetic energy from the tip of blade II is focused on the center of photodetector 8 such that photocells 10 and 11 are equally illuminated as shown by reference numeral 9 in FIG. 1a. If the gauge head were moved toward or away from the tip of blade II, the backscattered electromagnetic energy would unequally illuminate the two photocells as shown by circles 16 and 19 in FIG. 1la.

If the photo cells 10 and 11 are equally illuminated, currents I1 and I2 produced, respectively, by photocells 10 and 11 will be equal. A difference amplifier 17 receives the two currents I1 and I2, and outputs a difference signal of zero in this situation. When the difference between the currents I1 and I2 is zero, the gauge head 1 is in a null position with respect to the tip of blade II.

The difference between currents I1 and I2 also equals zero if no blade tip is present to scatter the beam of electromagnetic energy toward the photodetector, such as when the rotor disk is rotated to a position such that the optical axis of the objective lens and the imaging lens passes between two blades on the rotor disk. Thus, it is necessary to confirm the presence of a blade tip which scatters the beam of electromagnetic energy.

This is accomplished as follows. A summing amplifier 14 sums the currents I1 and I2 from the photocells to confirm the presence of the blade tip. The sum signal produced by the summing amplifier will be present whenever a tip of a blade backscatters the beam of electromagnetic energy onto the photodetector, even when the length of the blade is such that the tip of that blade falls closer or farther away from the gauge head than the focal plane as the blade passes through axis 4.

The difference and sum signals from amplifiers 14 and 17 are converted to logic level signals by adjustable threshold detectors 20 and 21. Specifically, the threshold detector 20 produces a true logic signal when the sum of I1 and I2 does not equal zero. The threshold detector 21 produces a true logic signal when the difference between I2 and I1 is greater than or equal to zero. A true logic signal from threshold detector 21 is a null sense signal indicating that at least one of the blade tips is in the focal plane 5, or is closer to the gauge head than the focal plane 5, when that blade tip passes axis 4. Such a true logic signal may also be produced when no blade tip is scattering the beam of electromagnetic energy.

A true logic signal from threshold detector 20 is a blade count signal which occurs every time a blade tip scatters the beam of electromagnetic energy toward the photodetector 8, whether or not the blade tip is in focal plane 5 when the blade passes through axis 4. As the rotor disk rotates about its axis of rotation, a series of blade count pulses is produced and fed to one input of an AND gate 22 and to one input of a gauge controller and data processor 23, an example of such gauge controller and data processor being available from Techmet of Dayton, Ohio. Coincidence of true logic signals from threshold detectors 20 and 21 indicates that a blade is present along axis 4 and that the gauge head 1 is positioned such that at least one of the blade tips is in the focal plane 5, or closer to the gauge head than focal plane 5, when that blade tip passes axis 4. This coincidence of true logic signals causes AND gate 22 to produce a null sense input to a data processor 23.

Blade II has a length such that its tip coincides with the focal plane 5 when blade II passes the optical axis 4 of the lenses 3 and 7 in its rotation about the axis of the rotor disk, as shown in FIG. 1. In this situation, the beam of electromagnetic energy is scattered from the tip of blade II toward photodetector 8 such that the two photocells 10 and 11 are illuminated equally. The currents produced by the photocells thus are equal and the output of the difference amplifier 17 is zero. The output of the summing amplifier is positive, which causes the threshold detector 20 to produce a true logic signal. Thus, a blade count signal is fed to one input of the AND gate 22 and to one input of the data processor 23. The zero output of the difference amplifier 17 results in the threshold detector 21 producing a true logic signal which is fed to the other input of the AND gate 22. Two logic true inputs to the AND gate 22 result in the production of a null sense signal fed to the data processor, which indicates that at least one of the blades on the periphery of the rotor disk, in the case of FIG. 1, blade II, is at least as long such that the tip of the blade coincides with focal plane 5 when the blade passes the optical axis 4 during its rotation about the axis of the rotor disk.

A true logic signal from threshold detector 21 is fed to the null sense input of the data processor through AND gate 22 to insure that a null sense signal is produced only when a blade tip is present at the axis 4. If the output of the threshold detector 21 were fed directly to the null sense input and no blade were present, the difference between I2 and I1 would be zero, the threshold detector 21 would produce a true logic signal, and a false null sense signal would be fed to the data processor. This is avoided by performing a logical AND between the output of the threshold detector 21 and the output of the threshold detector 20. When a blade intercepts the beam of electromagnetic energy, a blade count signal is produced. It is only when a blade count signal is produced, thus indicating that a blade is present, that a true logic signal from threshold detector 21 is passed by AND gate 22 to the null sense input of the data processor, thereby avoiding false null sense signals from being fed to the data processor.

Figure 4:
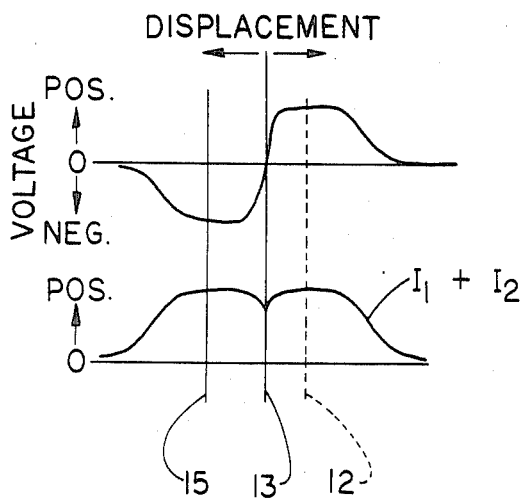

Some blades on the rotor disk, such as blades I and III in FIG. 1, may be longer or shorter than blade II so that the tips of those blades would be either closer or farther away from the gauge head than the focal plane 5 when those blades are rotated to the position occupied by blade II in FIG. 1. When a blade has a length such that the tip of the blade is closer to the gauge head than the focal plane 5 when that blade passes the optical axis 4 of the lenses, the beam of electromagnetic energy is scattered toward photodetector 8 such that the lower photocell 11 is illuminated to a greater extent than the upper photocell 10. See, for example, reference numeral 19 in FIG. 1A. An example of this situation would be when the tip of a blade falls in plane 18 in FIG. 1. In this case, the output of the difference amplifier 17 would be positive, thus resulting in a true logic signal from threshold detector 21 and in a null sense signal being fed to the data processor. The output of the summing amplifier 14 would be positive resulting in a true logic signal from threshold detector 20 and a blade count signal would be fed into the AND gate 22 and the data processor 23. See FIG. 4, which shows the outputs of summing amplifier 14 and difference amplifier 17 as a function of blade tip displacement with respect to the focal plane 5.

When a blade has a length such that the tip of the blade is farther away from the gauge head than the focal plane 5 when the blade passes the optical axis 4 in its rotation about the axis of the rotor disk, the beam of electromagnetic energy is scattered toward photodetector 8 such that the upper photocell 10 is illuminated to a greater extent than the lower photocell 11. An example of such a situation would be when the tip of a blade falls in plane 15 in FIG. 1. In this case, the output of the difference amplifier 17 would be negative and the output of the summing amplifier 14 would be positive. A true logic signal would thus be produced by threshold detector 20 and a false logic signal would be produced by threshold detector 21. A blade count signal would be fed to the data processor 23, but no null sense signal would be produced by AND gate 22 and fed to the data processor. Again, see FIG. 4.

Data relating to the lengths of all the blades on the rotor disk is obtained to get an indication of the clearance between the blades and the shroud. Blade lengths are ascertained by determining the location of the gauge head 1 with respect to the rotor's axis of rotation for each blade tip when the gauge head is positioned with respect to each blade tip such that a null sense signal is produced. The position of the gauge head relative to a rotor's axis is represented by a position signal from a position encoder 24 connected to the slide mechanism 1b. The signal from the encoder 24 is fed to data processor 23 and indicates the length of a blade which produces a null sense signal at the position of the gauge head. The data processor 23 controls a servo drive 28 which positions the slide mechanism and gauge head as described below. The length of each blade on the periphery of the disk is determined as follows.

Individual blade measurements are made while the rotor is spinning at, for example, 1000 to 3000 rpm. The gauge head 1 is initially positioned by the servo drive and slide mechanism in a fully retracted position, away from the rotor disk. Once the desired rotor disk has been ground and is rotating at a desired speed, the gauge head 1 is moved rapidly toward the rotor axis. This movement continues until the radial edge or tip of the longest blade coincides with the focal plane 5 so as to produce a null sense signal. To avoid overshooting this position of coincidence, the gauge head 1 is retracted a short distance beyond the place where the null sense signal was first produced and then is moved forward slowly until the null sense signal is produced again. When the null sense signal occurs, the length of the longest blade is determined by the data processor 23 from the signal produced by the position encoder 24. The apparatus next measures the lengths of the remaining blades on the periphery of the rotor disk, for example, blades I and III. The gauge head 1 is moved toward the rotor disk in discrete increments of, for example, 0.0001 inches until a second null sense signal is produced during one rotation of the rotor disk. This second null sense signal indicates that the second longest blade is positioned such that its tip is coincident with the focal plane when the blade passes the optical axis 4 during the rotation of the rotor disk. The length of this blade is determined in light of the position encoder signal when the second null sense signal is produced. The gauge head 1 continues to advance in increments. After each advancement, the data processor checks if there is any additional null sense signal produced during one rotation of the rotor disk. If there is, the data processor computes a blade length from the signal from the position encoder 24 when the additional null sense signal is produced. In this way, successively shorter blades of the rotor disk are inspected and their lengths determined until all of the blades on the rotor disk have been measured thus completing one inspection cycle. Additional inspection cycles may be performed until all disks making up the rotor have been inspected.

It is also necessary to correlate the measured blade lengths to particular blades. Blade correlation is accomplished by counting blades as they rotate. A blade count pulse is produced each time a rotating blade encounters the laser beam 2. As described above, the blade count pulses are produced by the summing amplifier 14 and threshold detector 20. A counter circuit in the data processor 23 is responsive to the blade count pulses such that the state of the counter circuit is related to the particular blade which has just passed the optical axis 4. The counter circuit is synchronized with the rotation of the disk so that the counter circuit has the same state after each time any given blade passes the optical axis. A revolution detector 26 produces a pulse for each rotation of the rotor disk. That pulse is a revolution sense signal which is connected to an input of the data processor. The revolution sense pulses reset the counter circuit to an initial state, in one embodiment, once per rotation of the disk. Such resetting of the counter circuit occurs at the same point in each rotation of the disk. Because of the synchronization of the counter circuit with the rotation of the disk in this manner, the data processor 23 is able to associate with each blade at the time a blade count signal is produced a unique position number related to the state of the counter circuit just after that blade passes the optical axis 4. In another embodiment, the counter circuit may be reset or initialized only once by the revolution sense signal during a complete inspection cycle for each rotor disk. Thereafter, the data processor would be able to keep track of the blades by only counting blade pulses if the data processor is given information about the number of blades on the rotor disk.

Spurious electromagnetic energy sources can cause false blade counts, however. These sources include random highly reflective surfaces near the blades.

Figure 2:
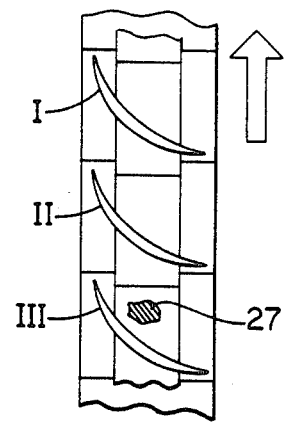
FIG. 2 shows a partial edge view of the rotor shown in FIG. 1 taken along line 2—2.

FIG. 2 is a partial edge view of the rotor disk showing the tips of blades I, II, and III. A bright surface 27 between blades II and III may cause an undesired scattering of electromagnetic energy.

Figure 3:
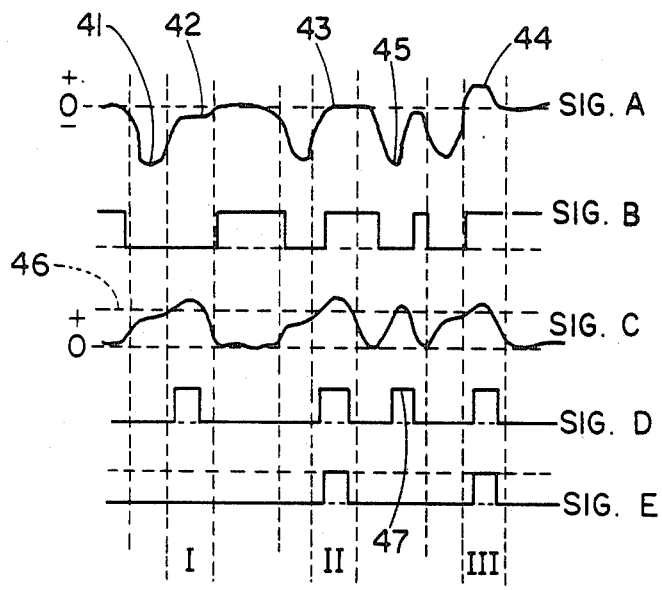
FIGS. 3 and 4 show signals produced by the apparatus of FIG. 1.

FIG. 3 shows oscilloscope traces of signals A, B, C, D, and E, which are produced by the FIG. 1 apparatus. Signal A represents the output of the difference amplifier 17. Signal B is produced by the threshold detector 21. The threshold detector 21 is adjusted such that signal B is at a logic one level when signal A is greater than or equal to zero. Segment 41 of signal A is typically produced by reflections from the sidewall of a blade approaching or receding from the optical axis 4. Segment 42 is produced when the tip of a blade is farther away from the gauge head than the focal plane 5 when the blade passes the optical axis 4. Segment 43 is produced when the tip of a blade coincides with the focal plane 5 when the blade passes the optical axis 4. Segment 44 is produced when the tip of a blade is closer to the gauge head than the focal plane 5 when the blade passes the optical axis 4. Segment 45 is produced by a reflection from area 27.

Figure 5:
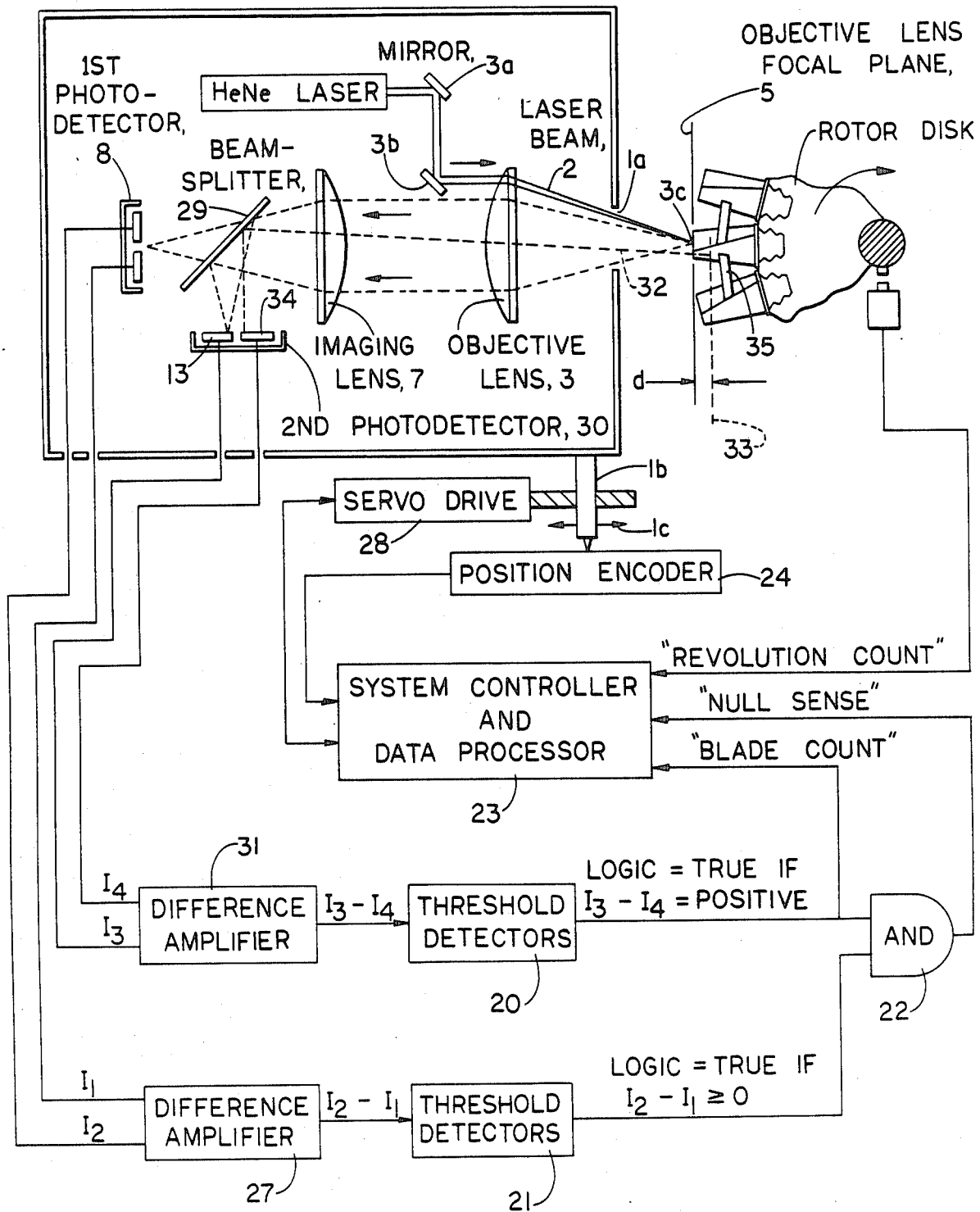
FIG. 5 shows a modification of the FIG. 1 apparatus having an extraneous electromagnetic energy discriminator in accordance with this invention.

Signal C represents the signal produced by the summing amplifier 14. Signal D is the output of threshold detector 20, which produces a logic one blade count pulse when the output of the summing amplifier exceeds level 46. Threshold level 46 of the threshold detector 20 is extremely difficult to set so that wide variations in blade tip reflectivities can be accomodated while at the same time giving the inspection apparatus the ability to discriminate against the effects of spurious scattering from areas such as area 27. Signal D thus includes a false blade count pulse 47 caused by the scattering of electromagnetic energy from area 27. Signal E is the output of AND gate 46, which is the null-sense signal. FIG. 5 shows an inspection system which deals with the problems of extraneous electromagnetic energy. In the FIG. 5 system, blade count error is eliminated by discriminating between electromagnetic energy from the beam scattered from surfaces within a predetermined distance of the focal plane 5 and electromagnetic energy not so scattered, for example, electromagnetic energy scattered from surfaces a predetermined distance farther away from the gauge head than the focal plane 5. Such predetermined distance may be about 0.040 inches.

To accomplish this discrimination, a beamsplitter 29 is positioned between the imaging lens 7 and the photodetector 8 so that the electromagnetic energy scattered from the tips of the blades is not only focused on the photodetector 8 but also on another photodetector 30. Photodetector 30 is horizontally positioned so that the scattered electromagnetic energy from objects in the focal plane 5 falls primarily on a photocell 13. This causes difference amplifier 31, which produces a signal related to the difference in the currents I3 and I4 produced by photocells 13 and 34, to produce an output voltage of positive polarity. This positive voltage is converted by threshold detector 20 to a true logic signal when the difference between I3 and I4 is positive. This true logic signal is a blade count signal.

Electromagnetic energy scattered from objects which are located farther away from the gauge head than plane 33, which is at a distance "d" from the focal plane 5, will be focused primarily on photocell 34 which results in a negative voltage output from difference amplifier 31 because the difference between I3 and I4 under this condition is negative. The output of the threshold detector 20 remains at a false logic level and no blade count signal is fed to AND gate 22 or data processor 23.

Distance "d" is determined by the position of photodetector 30 and is chosen so that only surfaces located very near the radial edges or tips of the blades as they pass through axis 4 are recognized by the system. For example, light reflected from structural element 35 would not produce an erroneous blade count pulse which may be produced in the apparatus of FIG. 1. Element 35 is located more than a distance "d" farther away from the gauge head than the focal plane 5 when element 35 passes through axis 4. Reflection of the beam of electromagnetic energy from the element 35 illuminates photocell 34 to a greater extent than photocell 13, which results in a negative signal from difference amplifier 31, a false logic level from threshold detector 20, and no false blade count signal.

Figure 6:
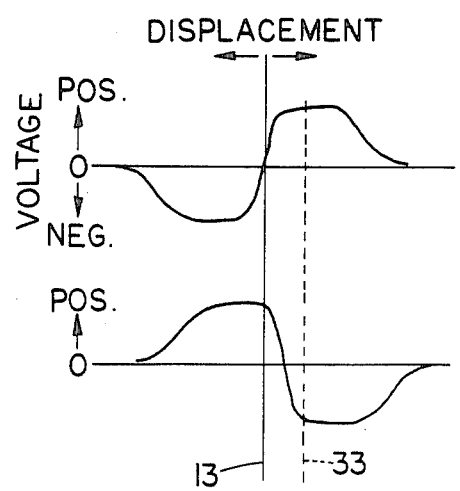
FIG. 6 shows signals produced by the FIG. 5 apparatus.

FIG. 6 shows the signals from the difference amplifiers 27 and 31 as a function of blade tip displacement from the focal plane 5.

In all respects other than as described above, the circuit of FIG. 5 operates to measure the lengths of the blades on the rotor disk in the same manner as the FIG. 1 apparatus.

Other versions of the invention may be constructed. For example, the horizontal location of photodetector 30 may be changed to vary the distance "d". The photodetector 30 may also be arranged so that the inspection system ignores electromagnetic energy scattered from objects greater than a predetermined distance closer to the gauge head than the focal plane 5. An additional photodetector and beamsplitter or additional photocells in the photodetector 30 may be employed to provide an inspection system which is sensitive only to electromagnetic energy scattered from objects within predetermined distances on either side of focal plane 5.

Figure 7:
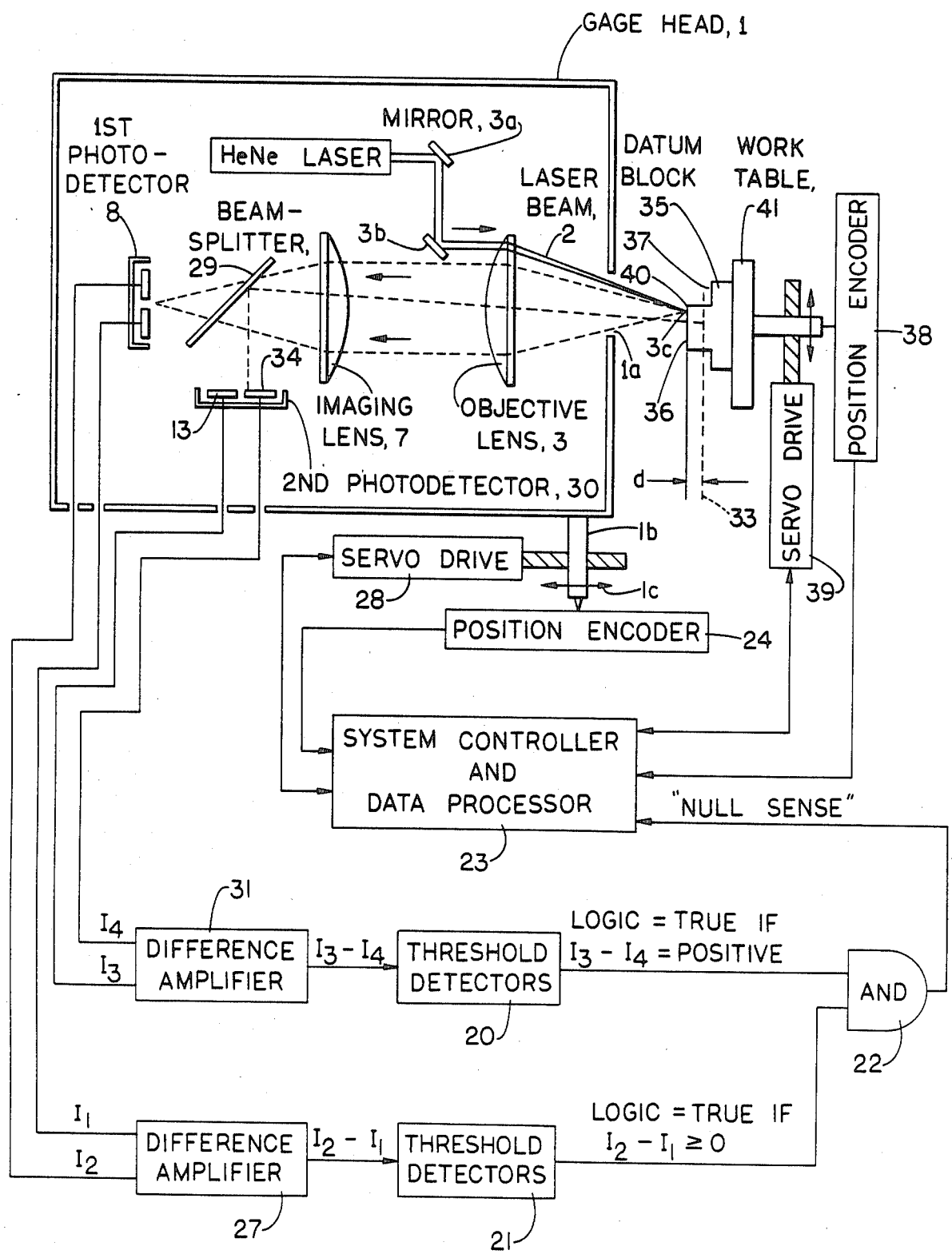
FIG. 7 shows a modification of the FIG. 4 apparatus.

FIG. 7 shows another application of the invention. It has circuitry similar to that shown in FIG. 5, but, in FIG. 7, the system determines the dimensions and positions of surfaces on a datum block 35a, which may be installed on positioning systems used on machine tools or other devices. Precision datum surfaces of known dimensions and locations are commonly used as reference standards for determining workpiece dimensions. In the apparatus of FIG. 7, through translation of gauge head 1 with respect to datum block 35a, the location and dimensions of surface 36 and edge 40 may be determined without interfering reflections from surface 37.

First, the datum block 35a is position by servo drive 39 so that surface 36 intersects the optical axis 4 of the gauge head 1. As described above, the gauge head then is moved from its retracted position until a null sense signal is produced, which occurs when the focal plane 5 coincides with surface 36 and focal point 3c falls on that surface. The signal from position encoder 24 indicates to the data processor 23 the horizontal location of surface 36. The servo drive then moves the work table 41 and datum block 35a vertically until the null sense signal is no longer produced, for example, when edge 40 coincides with the optical axis 4 of the gauge head. The position signal produced by position encoder 38 at this time indicates the vertical location of an edge 40 to the data processor 23. Other features of the datum block may be determined in a similar fashion.

I claim:

1. An electro-optical inspection apparatus, comprising:
    a means for producing a beam of electromagnetic energy;
    a first detection means responsive to electromagnetic energy of the beam scattered by objects in the path of the beam for indicating the location of those objects with respect to a first predetermined plane through which the beam passes;
    a second detection means responsive to electromagnetic energy scattered by objects in the path of the beam for indicating the location of those objects with respect to a second predetermined plane through which the beam passes, the second plane being situated a predetermined distance from the first plane; and
    a means responsive to the first and second detection means for indicating whether or not objects scattering electromagnetic energy of the beam are located between the first and second planes.

2. The apparatus of claim 1, in which the first detection means comprises a first detector and a second detector responsive to electromagnetic energy of the beam scattered by objects in the path of the beam;
    in which the second detection means comprises a third detector and a fourth detector responsive to electromagnetic energy of the beam scattered by objects in the path of the beam; and
    in which the means responsive to the first and second detection means comprises a means responsive to the first and second detectors for producing a signal related to the difference between the outputs of the first and second detectors, a means responsive to the third and fourth detectors for producing a signal related to the difference between the outputs of the third and fourth detectors, and a gating means responsive to the difference signal producing means.

3. An apparatus for inspecting the dimensions of blades used in a gas turbine engine, comprising:
- a means for rotating a plurality of blades about a center of rotation;
- a means for producing a beam of electromagnetic energy;
- a means for directing the beam of electromagnetic energy toward surfaces on the blades which indicate the dimensions of those blades; and
- a means for discriminating between electromagnetic energy from the beam scattered by the surfaces indicating the dimensions to be inspected and electromagnetic energy not so scattered.

4. An apparatus for determining a characteristic of an object, comprising:
- a means for producing a beam of electromagnetic energy and directing the beam toward a surface on an object which indicates the characteristic of that object to be determined; and
- a means responsive to electromagnetic energy from the beam scattered from the surface on the object which indicates the characteristic of the object to be measured for discriminating between electromagnetic energy so scattered and electromagnetic energy not so scattered.

5. The apparatus of claim 4, in which the object is a blade for a gas turbine engine.

6. The apparatus of claim 4, in which the object is a datum block for use in a machine tool.

7. An electro-optical inspection system, comprising:
- a means for producing a beam of electromagnetic energy; and
- a means for discriminating between (a) electromagnetic energy of the beam scattered from objects situated less than a predetermined distance away from a plane through which the beam of electromagnetic energy passes and (b) electromagnetic energy scattered from objects situated at a distance from that plane greater than the predetermined distance.

8. The electro-optical inspection system of claim 7, further comprising:
- a means for focusing the beam of electromagnetic energy; and
- wherein said plane is a focal plane of the focusing means.

* * * * *